United States Patent [19]

Nelson

[11] Patent Number: 4,755,921

[45] Date of Patent: Jul. 5, 1988

[54] LENS

[75] Inventor: John C. Nelson, Santa Rosa, Calif.

[73] Assignee: Minnesota Mining and Manufacturing Company, St. Paul, Minn.

[21] Appl. No.: 16,468

[22] Filed: Feb. 17, 1987

Related U.S. Application Data

[63] Continuation of Ser. No. 847,322, Apr. 2, 1986, abandoned.

[51] Int. Cl.⁴ .................................................. F24J 3/02
[52] U.S. Cl. .................................... 362/307; 350/445; 350/127; 350/452; 362/309; 362/348; 126/438
[58] Field of Search ............... 362/307, 296, 348, 297, 362/299, 308, 309; 350/452, 127, 440, 445, 451, 299; 355/38; 126/438, 440

[56] References Cited

U.S. PATENT DOCUMENTS

| | | | |
|---|---|---|---|
| 1,986,065 | 7/1963 | Kogg et al. | 362/332 |
| 3,267,278 | 8/1966 | Doolittle | 362/309 |
| 3,348,037 | 8/1965 | Taltavall | 362/309 |
| 3,457,400 | 7/1969 | Appeldorn | 362/307 |
| 3,721,818 | 3/1973 | Stalhat | 362/309 |
| 4,177,505 | 12/1979 | Carel | 362/309 |
| 4,337,759 | 7/1982 | Popovich et al. | 126/438 |
| 4,450,509 | 5/1984 | Henry | 362/309 |

Primary Examiner—Raymond A. Nelli
Attorney, Agent, or Firm—Donald M. Sell; James A. Smith; Stephen W. Buckingham

[57] ABSTRACT

A lens of a transparent material including a structured surface on one side and a smooth surface on the opposite side. The structured surface includes a plurality of three-faceted prisms arranged side by side to form a plurality of ridges and grooves. Each prism has a reflective surface adjacent to a refractive surface and a riser adjacent to the refractive surface. The surfaces are angled with respect to one another so that incident light is transmitted through the lens, whereby the exiting rays may be predisposed to be perpendicular or non-perpendicular. Because of this the lens can be used to disperse, collimate, gather or concentrate the light. Thus, it may be utilized in a variety of ways, for example, in a light fixture, whereby high-angle incident light directed toward either the structured surface or the smooth surface, is transmitted through the lens and is directed in a desired fashion.

18 Claims, 5 Drawing Sheets

LENS

This is a continuation of application Ser. No. 847,322 filed Apr. 2, 1986, now abandoned.

FIELD OF THE INVENTION

The present invention relates to a lens of a transparent material, and in one aspect to a low F/number polymeric catadioptric lens for use in a light fixture.

BACKGROUND OF THE INVENTION

It is known to use catadioptric Fresnel-type lenses including a catadioptric portion consisting of a plurality of two-faceted prisms as, for example, disclosed in a summary on "TIR FRESNEL LENSES" by Dr. Lawrence W. James, reported on pages 215-221 of the proceedings for the Tenth Photovoltaic Concentrator Project Integration Meeting, Albuquerque, New Mexico, Apr. 6 & 7, 1983 and prepared by Sandia National Laboratories. Each prism has a refractive surface and a reflective surface, to form the lenses' structured surfaces to refract and reflect light from a light source striking those structured surfaces. In addition, such lenses have included conventional Fresnel-type portions at their center and terminating where the efficiency of the conventional portions approaches the efficiency of the catadioptric portions of the lenses. However, such lenses have suffered from the inability of the radial outer peripheral prisms in the catadioptric portions to properly refract all of the light incident upon each refractive surface at high incident angles to be internally reflected by each reflective surface. Thus, because of the high incident angles required at large radii, much of the light is lost. As a practical matter, this inability restricts the lenses' speeds, (i.e. F/numbers), or the efficiency of large angle bending of light rays.

SUMMARY OF THE INVENTION

The present invention provides a lens that maintains high transmission efficiency at extremely low F/numbers. The lens is made of a transparent material, and includes a structured surface on one side and a smooth surface on the opposite side. The structured surface includes a plurality of three-faceted prisms arranged side by side to form a plurality of radial or linear ridges and grooves depending upon the type of light source, i.e. point or linear. As used in this lens, each of the three-faceted prisms has a reflective surface adjacent to a refractive surface and a riser adjacent to the refractive surface. Each reflective surface of the prism is inclined at an angle to the smooth surface of the lens to totally internally reflect and direct incident light striking the reflective surface. Each refractive surface is inclined at an angle to its adjacent riser. The degree of inclination of each refractive surface and each adjacent reflective surface is such that high-angle incident light upon each refractive surface is refracted toward each reflective surface. This refracted light is then internally reflected by each reflective surface, disposed at the predetermined angle, within each three-faceted prism to direct the light out of the lens through the smooth surface at the desired angle. It should also be appreciated, that light may be incident on the smooth surface, and reflected and refracted out of the lens through the structured surface to, for example, gather, concentrate or disperse the light.

The ability to refract and reflect high-angle incident light results in the lens being able to have very fast speeds (i.e. low F/numbers). This allows for more compact optical devices. Alternatively, this increases the degree of efficiency of devices using present lenses having specific diameters and focal lengths. Thus, one advantage of the lens of the present invention is that it can be easily integrated into present light fixtures to boost their efficiency or to reduce their depths, i.e make them more compact.

A light fixture according to the present invention comprises a generally opaque housing including a central cavity. At least one side of the housing includes an optical window in which a lens of the present invention is positioned. A light source is located within the housing cavity for supplying light to the optical window in which the lens is positioned. The structured surface of the lens is adjacent to the light source so that incident light is transmitted through the lens by a combination of refraction and reflection. This ability is particularly useful, for example, in taillamps or spotlights. In addition, a reflector may be associated with the central cavity to reflect light back towards the light source to increase the efficiency.

DESCRIPTION OF THE DRAWINGS

The present invention will be more fully described with reference to the accompanying drawings wherein like reference numerals identify corresponding components, and.

DETAILED DESCRIPTION OF THE PREFERRED EMBODIMENT

Referring to FIGS. 1-4 of the drawings, a lens of the present invention, generally designated 20, may be used in a light fixture 22 for directing light from a light source 24. The light fixture 22 includes a housing 26 having an optical window 28 and an inner cavity 30 in which the light source 24 is supported for supplying light to the optical window 28. The lens 20 is positioned within the optical window 28 and is made of a transparent material having a structured surface 34 on one side and a smooth surface 36 on the opposite side.

Figures 2, 3, 4:
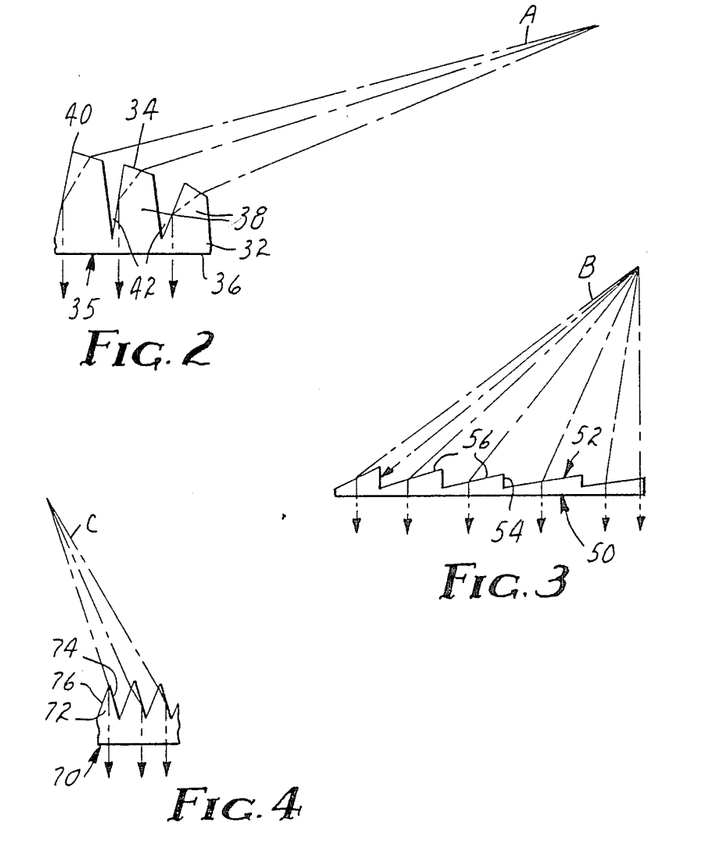
FIG. 2 is an enlarged schematic cross-sectional view of a portion of the periphery of the lens of the present invention, showing the refraction and reflection of light rays.
FIG. 3 is an enlarged schematic cross-sectional view of a portion of the center of the lens of the present invention, showing the refraction of light rays.
FIG. 4 is an enlarged schematic cross-sectional view of the transition zone of the lens of the present invention, showing the refraction and reflection of light rays.

A positive condensing lens is illustrated in FIG. 2. The structured surface 34 of the lens is positioned adjacent the light source 24 and includes at its periphery a catadioptric portion 35 consisting of a plurality of three-faceted prisms 38 arranged side by side to form a plurality of ridges 40 and grooves 42. The three-faceted prisms 38 are arranged side by side to form either radial or linear ridges 40 and grooves 42 depending upon whether a point or linear light source 24 is used, whereby light rays A are transmitted through the lens.

In addition, the lens 20 of the present invention may have areas, such as a central refractive portion 50 as illustrated in FIG. 3, with, for example, a configuration like a conventional Fresnel-type lens, as illustrated in U.S. Pat. Nos. 3,744,882 (Forster, Jr.), 3,293,982 (Appeldorn) and 4,076,384 (Deml, et al.) the disclosures of which are hereby incorporated by reference. The central refractive portion 50 is located at the center of the lens 20 adjacent to the peripheral catadioptric portion 35 consisting of the three-faceted prisms 38 illustrated in FIG. 2. The central refractive portion includes a plurality of refracting elements 52 each having a riser 54 and a refractive surface 56 whereby light rays B are transmitted through the lens. The central refractive portion 50 and the peripheral catadioptric portion 35 are separated by a transition zone 70, illustrated in FIG. 4, located where the efficiency of the refracting elements 52 approaches the efficiency of the three-faceted prisms 38. As illustrated in FIG. 4, the transition zone 70 may comprise one or more two-faceted prisms 72 having a reflective surface 74 and an adjacent refractive surface 76 whereby light rays C are transmitted through the lens.

Figure 5:
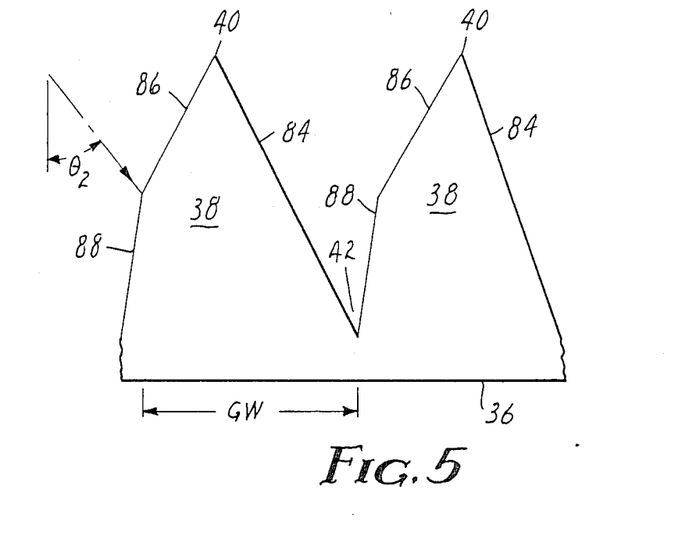
FIGS. 5 and 9 are enlarged schematic cross-sectional views of two adjacent three-faceted prisms of the lens of the present invention illustrating light ray geometry.

As illustrated in greater detail in FIG. 5, each three-faceted prism 38 of the catadioptric portion 35 includes a reflective surface 84 adjacent to a refractive surface 86 and a riser 88 adjacent to the refractive surface 86. Each reflective surface 84 is inclined at an angle to the smooth surface 36 to totally internally reflect and direct incident light striking each reflective surface 84. Each refractive surface 86 is inclined at an obtuse angle to each adjacent riser 88 and at an acute angle to each reflective surface 84. The degree of inclination is such that high-angle incident light from the light source 24 is refracted at each refractive surface 86. This high-angle incident light is refracted at an angle such that the light that strikes each adjacent reflective surface 84, is internally reflected by each reflective surface 84 within each three-faceted prism 38, and is directed out of the lens 20.

For ease of manufacture, the lens 20 may include a plurality of concentric rings, wherein each ring includes at least two three-faceted prisms 38 in which the degree of inclination of the refractive surfaces 86 to the adjacent risers 88 is constant within each ring and varies from ring to ring over the diameter of the lens 20.

Figure 6:
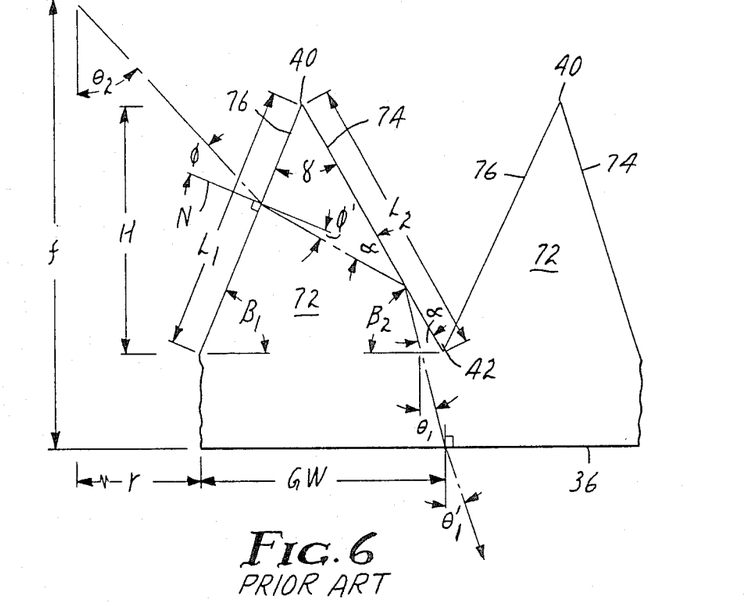
FIGS. 6 and 8 are enlarged schematic cross-sectional views of two adjacent two-faceted prisms of a prior art lens illustrating light ray geometry.

Because of the degree of refraction required, the degree of inclination of the refractive surfaces 86 decreases with increasing radius of the lens 20 outward. In addition, all of the refractive surfaces 86 and reflective surfaces 84 focus the light to a design-determined region or regions. This relationship is demonstrated by the following equations:

(1) As illustrated in FIG. 6, a prior art two-faceted prism 72 has a width between grooves GW. The variable $\theta_2$ defines the incident angle of a ray from the light source 24 for a given portion of the lens 20 whereby:

$$\theta_2 = \arctan(r/f)$$

where r is the radius of the facet measured from the center of the lens, and f is the desired focal distance.

(2) In addition, the path of the incident light ray through the two-faceted prism 72 can be defined if: (A) $\phi$ is the angle between the normal N of the refractive surface 76 and the incident ray; (B) $\beta_1$ is the angle between the refractive surface 76 and the smooth surface 36; (C) $\beta_2$ is the angle between the reflective surface 74 and the plane of the lens 20; and (D) the transparent material has a refractive index n associated therewith, and the incident medium has an index of refraction of 1. Then, the angle $\phi$ of the internally refracted ray with respect to the normal N of the refractive surface 76 can be defined by Snell's Law as follows:

$$\phi' = \arcsin[\sin\phi/n]$$

(3) The angle $\gamma$ of the apex or ridge 40 of the two-faceted prism 72 is defined as follows:

$$\gamma = \pi - \beta_1 - \beta_2$$

where $\pi$ is equal to 180°.

(4) The height H of the two-faceted prism 72 is defined as follows:

$$H = L_1 \sin(\beta_1)$$

where $L_1$ is the length of the refractive surface 76.

(5) The complement $\alpha$ of the angle between the incident ray and the reflective surface 74 is defined by the following equation:

$$\alpha = \pi/2 - \gamma - \phi'$$

where as long as the result of $(\pi/2 - \alpha)$ exceeds the critical angle which is equal to the arcsine of $(1/n)$, there will be internal reflection.

(6) The angle $\theta_1$ between the ray after being reflected and the normal N to the smooth surface 36 is defined as follows:

$$\theta_1 = \pi/2 - \alpha - \beta_2$$

(7) The angle $\theta_1'$ between the exiting ray and the normal N to the smooth surface 36 is defined by Snell's Law as follows:

$$\theta_1' = \arcsin[n \cdot \sin(\theta_1)]$$

As a first approximation for defining the geometry of the two-faceted prism 72, the incident angle $\phi$ is chosen arbitrarily, and the angle $\beta_2$ of the reflective surface 74 is chosen such that the exiting ray angle $\theta_1'$ is the desired angle for the particular purpose of the lens.

Figure 7:
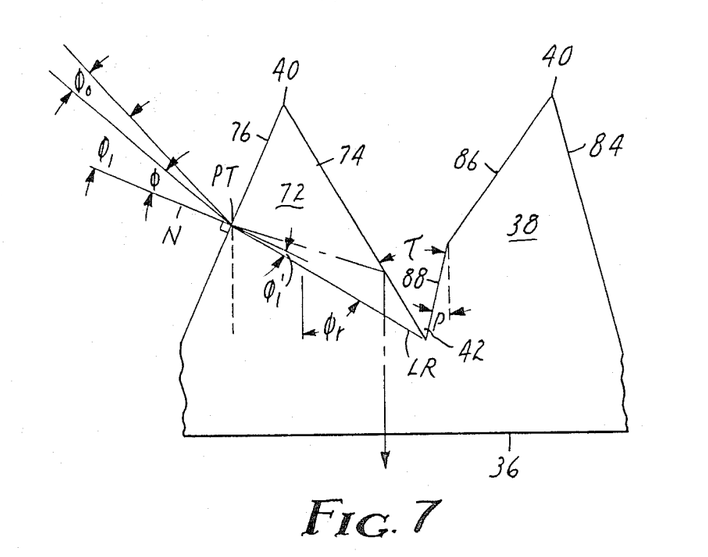
FIG. 7 is an enlarged schematic cross-sectional comparison view of a two-faceted prism and a three-faceted prism illustrating light ray geometry.

(8) As illustrated in FIG. 7, for the given value of $\theta_2$ and the choice of angle $\beta_1$ all rays incident on refractive surface 76 will not, in general, be transmitted through the two-faceted prism 72 because some rays internal to the prism will miss the reflective surface 74. However, if one now chooses a maximum ray incident angle $\phi_1$ defined as follows:

$$\phi_1 = \phi + \phi_0$$

so that where $\phi_0$ can represent angular errors in manufacture or alignment, transmission through the lens will still be large. Then, a limiting ray LR internal to the prism 72 and incident on the portion of the reflective surface 74 at the valley of the groove 42 will be defined, whereby all rays between the limiting ray LR and the maximum ray will be transmitted through the lens. The angle $\phi_1'$ between the limiting ray LR and the normal N is defined as follows:

$$\phi_1' = \arcsin[\sin(\phi_1)/n]$$

(9) The angle $\phi_r$ of the internal limiting ray LR with respect to the normal N to the smooth surface 36 is defined as follows:

$$\phi_r = \beta_1 - \phi_1'$$

Thus, all rays incident on the portion of the refractive surface 76 between the ridge 40 and the point of intersection PT of the limiting ray LR and the refractive surface 76 will be transmitted through the lens by refraction and total internal reflection. This portion of refractive surface 76 corresponds to the refractive surface 86 of the three-faceted prism 38 of the present invention. Also, all rays incident at angle $\phi_1$ on the refractive surface 76 that are between the intersection point PT and the groove 42 will not reach the reflective surface 74. Thus, they will not be directed in the intended direction. It is thus desirable to minimize the lost area in order to maximize the light transmission. This can be accomplished if, as illustrated in FIG. 7, a third facet or optically inactive riser 88 is provided using a minimum included angle $\tau$ between the riser 88 and the reflective surface of an adjoining groove. In this way, the wasted area can be minimized. It is also desirable that a positive relief angle $\rho$ be formed if the lens is to be replicated by standard molding techniques. Negative relief angles up to the angle of the limiting ray angle $\phi_r$ will further increase efficiency for some cases, but if the relief angle $\rho$ is negative, replication will be difficult or impossible.

As illustrated in FIG. 5, in order to optimize the final design, the actual transmission through the three-faceted prisms 38 of the catadioptric portion 35 must be calculated and the angle of the refractive surface 86 chosen so that first surface Fresnel reflection losses at the refractive surface 86 are balanced against geometric losses caused by light striking a portion of the optically inactive riser 88.

(10) It has been found through analysis using a digital computer where:
n=1.49
$\tau$=30°
$\rho$=3° minimum
that rays up to 8° ($\phi_0$) off of the design incident angle will be accepted, and that the following polynominal equation describing the incident angle $\phi$ with respect to the normal of the refractive surfaces 86 as a function of incident ray angle $\theta_2$ will, with the above equations, result in a lens design that will approach optimum for F/numbers from approximately F/1 to F/0.09:

$$\phi_1(\theta_2) = A_0 + A_1 \cdot \theta_2 + A_2 \cdot \theta_2^2 + A_3 \cdot \theta_2^3 + A_4 \cdot \theta_2^4 + A_5 \cdot \theta_2^5$$

where:
$A_0$=221.2254
$A_1$=−20.1561
$A_2$=0.9851196
$A_3$=−0.0235279
$A_4$=0.0002532145
$A_5$=−1.00828·10E−6

Then, the angle $\beta_1$ of the refractive surface 86 can be determined from the following:

$$\beta_1 \theta_2 + \phi$$

Utilizing these formulae one obtains the following angles defining the three-faceted prism geometry, in degrees, for a unit Focal length lens:

TABLE

| r | $\theta_2$ | $\phi$ | $\beta_1$ | $\beta_2$ | $\rho$ |
|---|---|---|---|---|---|
| .5 | 26.56 | 52.66 | 79.23 | 66.50 | 6.50 |
| 1.5 | 56.31 | −16.00 | 40.31 | 64.54 | 4.54 |
| 2.5 | 68.20 | −44.39 | 23.81 | 64.13 | 4.13 |
| 3.5 | 74.05 | −54.31 | 19.74 | 63.62 | 3.63 |
| 4.5 | 77.47 | −60.05 | 17.41 | 63.52 | 3.52 |
| 5.5 | 79.69 | −64.39 | 15.34 | 63.74 | 3.74 |

Figure 8:
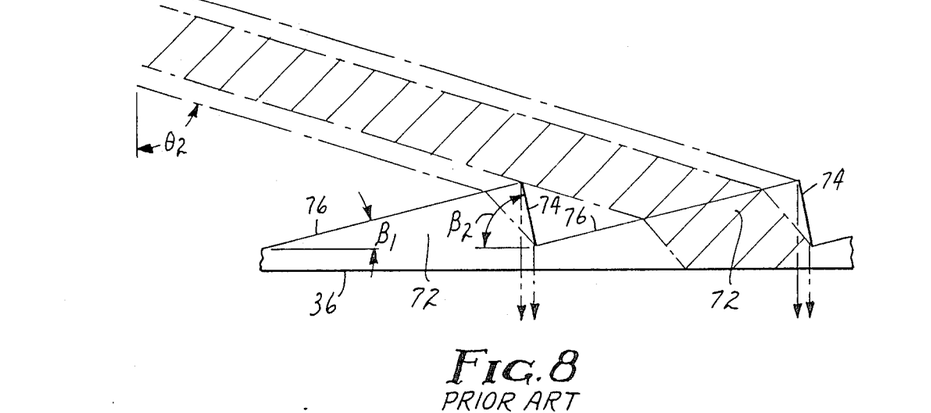
Figure 9:
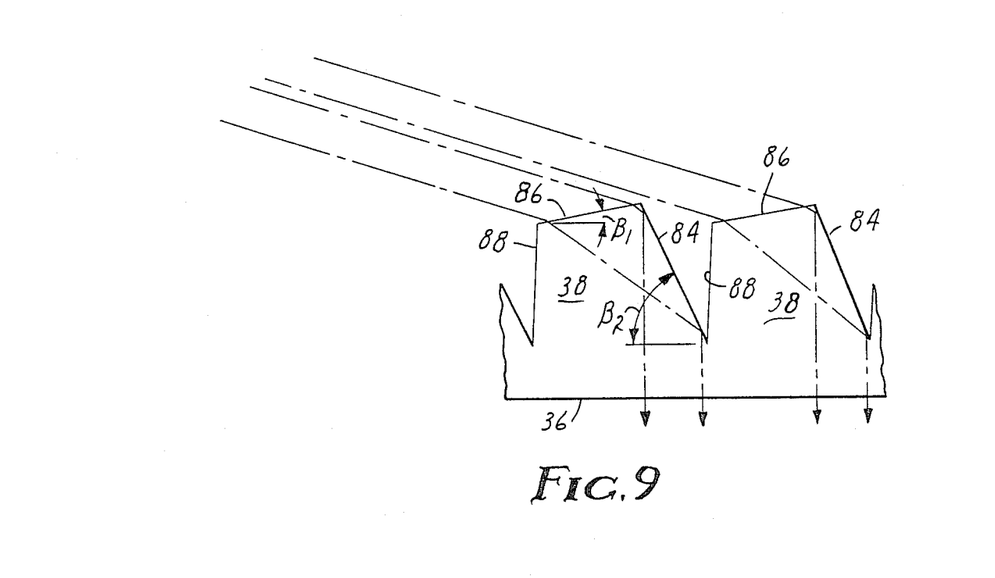

It has been found that the three-faceted prisms 38, illustrated in FIGS. 5 and 9, transmit substantially more of the light incident upon their refractive surfaces 86 than do the prior art two-faceted prisms 72, illustrated in FIGS. 6 and 8. Referring to FIG. 8 when the ray angle $\theta_2$ becomes large and a two-faceted prism 72 of the prior art is designed so that rays are refracted and then totally internally reflected out of the smooth surface 36, a large portion of the ray bundle will not strike the reflective surface 74 and will be lost. In contrast, as illustrated in FIG. 9, if the three-faceted prisms 38 of the present invention are designed with substantially the same angles as the two-faceted prisms 72 illustrated in FIG. 8, on the refractive surface 86($\beta_1$) and reflective surface 84($\beta_2$), more of the light will be transmitted through the lens in the intended direction because the inactive area of the two-faceted prisms 72 has been substantially reduced by using the riser 88 of the three-faceted design.

Figure 10:
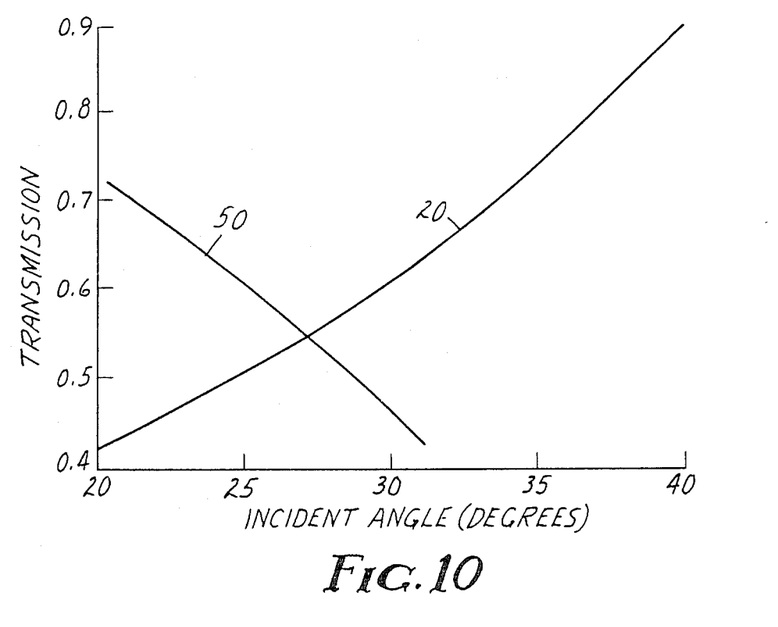
FIG. 10 is a graph illustrating the relationship between transmission and incident angle of light rays.

The relationship between the central refractive portion 50 and the catadioptric portion 35 is demonstrated by the graph in FIG. 10 which shows a comparison of transmission efficiency verses F/numbers for a conventional Fresnel-type lens 50 and the lens 20 of the present invention in which the structured surface 34 consists entirely of the three-faceted prisms 38 of the catadioptric portion. The conventional design is most efficient at lower angles of incident light (i.e. higher F/numbers), whereas the catadioptric design is most efficient at higher angles of incident light (i.e. lower F/numbers). Thus, to optimize performance of the lens 20 of the present invention in situations where the lens 20 is to be optically active over its entire diameter, the transition zone 70 should be positioned where these two efficiencies are approximately equal.

In addition, it should be appreciated that the lens 20 may be designed in accordance with the above to provide that the exiting rays are perpendicular or non-perpendicular to the smooth surface 36.

The particular material used for the lens 20 may vary, but it is intended that in most applications the material be generally rigid. It is, however, essential that the material be transparent, and preferably homogeneous and isotropic, for example, polymeric materials or glass. Useful polymeric materials for this purpose are commercially available acrylics and polycarbonates having nominal indices of refraction of 1.49 and 1.58, respectively. Other useful polymers are polypropylenes, polyurethanes, polystyrenes, polyvinyl chlorides, and the like. The particular material selected is not significant to the invention hereof, so long as it provides the described function. Normally, the manufacturers of this product will select the best commercially available material based upon price, application and manufacturing process. However, acrylics and polycarbonates are of particular interest because of their physical properties, i.e. weatherability, ultraviolet resistance, dimensional stability, and temperature tolerance.

There are several ways to mass produce the lens 20 of the present invention which are well known to those skilled in the art, for example as illustrated in U.S. Pat. No. 4,244,683 (Rowland) and U.K. patent application No. GB2,127,344A (Pricone et.al.), the disclosures of which are hereby incorporated by reference. The particular manufacturing process is not essential to the present invention, and is a matter of choice based upon economics and availability. Presently, prototypes of the lens 20 have been made by compression molding a 0.025 inch thick acrylic sheet.

The thickness of the lens 20 is not particularly essential to the present invention, however, the applicability of the lens 20 for a particular use, such as a vehicle taillamp, may be dependent upon its thickness.

APPLICATION AND USE

The most promising use of the lens 20, due to its ability to operate efficiently at high lens speeds (i.e., low F/numbers), is in reducing the depth of vehicle taillamps and the like. In addition, the lens provides for large diameter spotlights having small focal lengths. Also, the lens 20 may be used to gather or concentrate light incident on the smooth surface 36 for solar concentrators and the like. Further, the lens 20 may be used as a field lens for use in, for example, overhead projectors or projection televisions of the types illustrated in U.S. Pat. Nos. 3,293,982 (Appeldorn), 3,830,556 (Bratkowski) and 4,054,907 (Itoh, et al.), the disclosures of which are hereby incorporated by reference.

Figure 1:
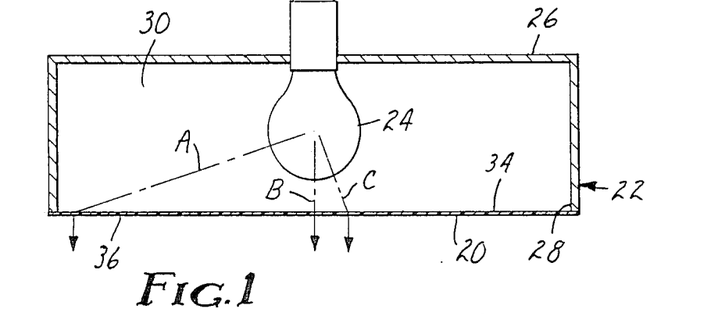
FIG. 1 is a cross-sectional view of a light fixture utilizing the lens of the present invention.
Figure 11:
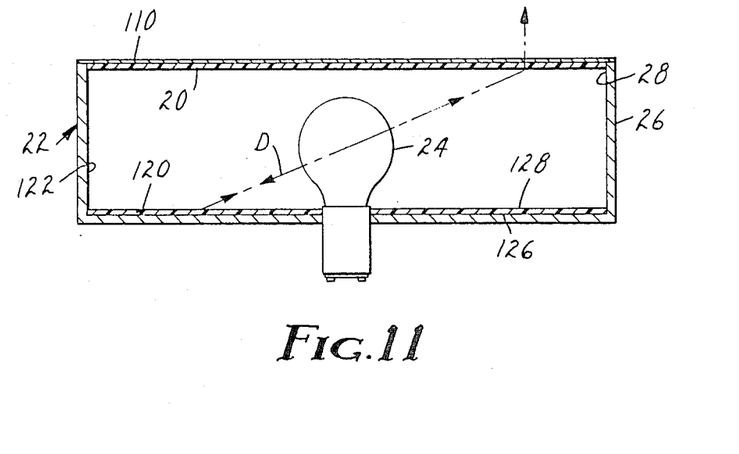
FIG. 11 is a cross-sectional view of an alternative embodiment of a light fixture utilizing the lens of the present invention.

The lens 20 may be used in a light fixture 22, as illustrated in FIGS. 1 and 11 wherein the lens 20 is positioned in the optical window 28 of the housing 26. The housing may be made by forming, bending or extruding a suitable material, such as aluminum or polycarbonate. In addition a diffuser 110 may be provided in the optical window 28 to redistribute or disperse the light in a desired fashion, as illustrated in FIG. 11. As an alternative, the diffuser may be incorporated into the lens 20 of the present invention by adding diffusing or reflecting particles, to the transparent material, or by forming pillows as an integral part of the smooth surface 36 (not shown).

Figure 12:
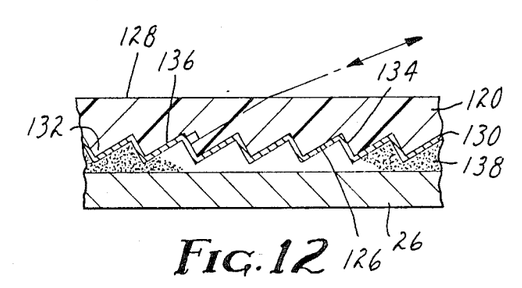
FIG. 12 is an enlarged schematic cross-sectional view of a portion of the reflector of the light fixture of FIG. 11 showing the reflection of light rays.

As illustrated in FIGS. 11 and 12 to increase the efficiency of the light fixture 22, a reflector such as, a spherical reflective Fresnel-type lens 120 of a polymeric material, may be associated with the inner surface 122 of the housing 26 to reflect light incident upon the reflector back towards the light source. As illustrated in FIG. 12, the reflector 120 includes a structured surface 126 on one side and a smooth surface 128 on the opposite side. The structured surface may include a reflective coating 130, for example, by vapor coating aluminum, and consist of a plurality of reflective elements 132 each having a reflective step 134 and an adjacent riser 136. The reflective steps 134 are inclined to reflect the incident light back towards the light source 24 where it passes through the light source to strike the structured surface 34 of the lens 20 of the present invention. Thus, as illustrated, light ray D will be reflected back towards the light source 24 by reflector 120. The reflector 120 may be adhered to the housing by a suitable pressure-sensitive adhesive layer 138.

A suitable light source 24 may include an artificial source, as disclosed, for example, in U.S. Pat. No. 4,081,667 (Lewin et al.), the disclosure of which is hereby incorporated by reference.

I claim:
1. A lens of a transparent material, comprising:
 a structured surface on one side and a smooth surface on the opposite side;
 said structured surface including a plurality of three-faceted prisms arranged side by side to form a plurality of ridges and grooves forming a peripheral annular catadioptric portion of said lens;
 each three-faceted prism having a reflective surface adjacent to a refractive surface and a riser adjacent to said refractive surface;
 each reflective surface being inclined at an angle to said smooth surface to totally internally reflect and direct incident light striking each reflective surface;
 each refractive surface being inclined at an angle to each adjacent riser and at an angle to each adjacent reflective surface so that high-angle incident light is refracted at each refractive surface toward each reflective surface at an angle whereby the light is internally reflected by each reflective surface within each three-faceted prism and directed out of said lens through said smooth surface; and
 said structured surface further comprising a central refractive portion and an annular transition zone between said central refractive portion and said peripheral catadioptric portion.
2. The lens defined in claim 1 wherein said three-faceted prisms are arranged side by side to form a plurality of annular ridges and grooves.
3. The lens defined in claim 2 wherein said central refractive portion includes a plurality of refracting elements to form a plurality of radial ridges and grooves.
4. The lens defined in claim 3 wherein said annular transition zone includes at least one two-faceted prism of radial configuration and having a reflective surface and an adjacent refractive surface.
5. The lens defined in claim 1 further comprising a plurality of concentric rings, each ring including at least two of said three-faceted prisms, wherein the degree of inclination of each refractive surface to each adjacent riser is varied from ring to ring over the diameter of said lens.
6. The lens defined in claim 5 wherein the degree of inclination from ring to ring decreases with increasing radius of the lens outward.
7. The lens defined in claim 6 wherein all of said refractive surfaces and said reflective surfaces focus on a common region.
8. The lens defined in claim 1 wherein the degree of inclination of each refractive surface to each adjacent riser and the degree of inclination of each adjacent reflective surface is varied over the diameter of said lens so that each refractive surface and each adjacent reflective surface cooperates to refract and reflect light incident upon each refractive surface and each reflective surface from the focal point of said lens out of said lens.

9. The lens defined in claim 1 wherein each refractive surface is inclined at an obtuse angle to each adjacent riser.

10. The lens defined in claim 9, wherein each refractive surface is inclined at an acute angle to each adjacent reflective surface.

11. A light fixture, comprising
a housing having an inner cavity and at least one optical window;
light source means within said housing cavity for supplying light to said optical window;
a lens in said optical window, said lens being formed of a transparent material and having a structured surface on one side and a smooth surface on the opposite side, said structured surface being positioned on the side adjacent to said light source means and including a plurality of three-faceted prisms arranged side by side to form a plurality of ridges and grooves, each three-faceted prism having a reflective surface adjacent to a refractive surface and a riser adjacent to said refractive surface, each reflective surface being inclined at an angle to internally reflect and direct incident light upon each reflective surface, and each refractive surface being inclined at an angle to each adjacent riser and at an angle to each reflective surface whereby high-angle incident light is refracted at each refractive surface toward each reflective surface where the light is internally reflected once within each three-faceted prism and direted out of said lens, and said smooth surface having dispersion means associated therewith for dispersing light exiting said lens.

12. The light fixture defined in claim 11 wherein said dispersing means includes a plurality of pillow elements associated with said smooth surface for dispersing light exiting said lens in a desired manner.

13. The light fixture defined in claim 11 further comprising reflector means associated with the central cavity of said housing for reflecting light incident upon said reflector means from said light source means back towards said light source means.

14. The light fixture defined in claim 13 wherein said reflector means includes a spherical reflective Freshnel-type lens of a polymeric material, said spherical reflective Fresnel-type lens having a structured surface on one side and a smooth surface on the opposite side, said structured surface including a plurality of annular reflecting elements to form a plurality of radial ridges and grooves.

15. The light fixture defined in claim 11 wherein said three-faceted prisms are arranged side by side to form a plurality of radial ridges and grooves.

16. The light fixture defined in claim 11 wherein said three-faceted prisms are arranged side by side to form a plurality of linear ridges and grooves.

17. The light fixture defined in claim 11 wherein each refractive surface is inclined at an obtuse angle to each adjacent riser.

18. The light fixture defined in claim 17 wherein each refractive surface is inclined at an acute angle to each adjacent reflective surface.

* * * * *